Figure 1:
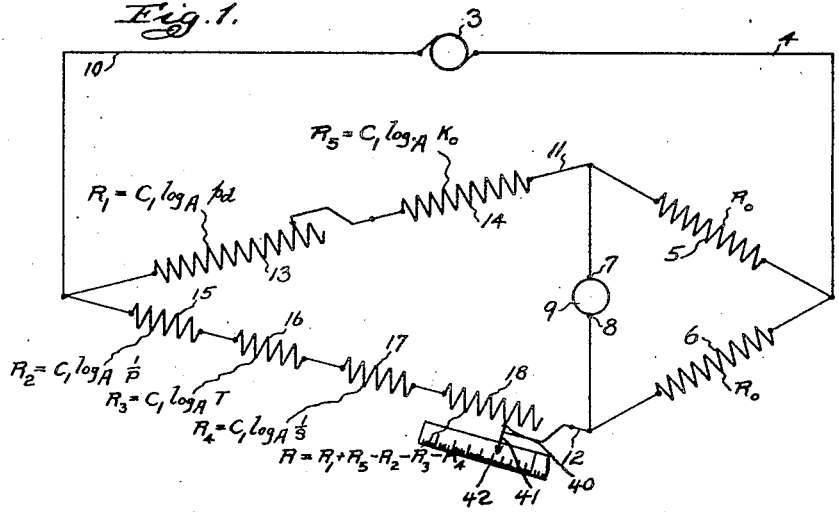

Feb. 23, 1926.

J. M. NAIMAN

LOGARITHMIC RESISTANCE CIRCUIT FOR MEASURING
COMBINATIONS OF DIFFERENT FACTORS

Filed Dec. 24, 1921  2 Sheets-Sheet 1

1,573,850

Witness
Richard J. Jacker
John J. Novy

Inventor:
Julius M. Naiman

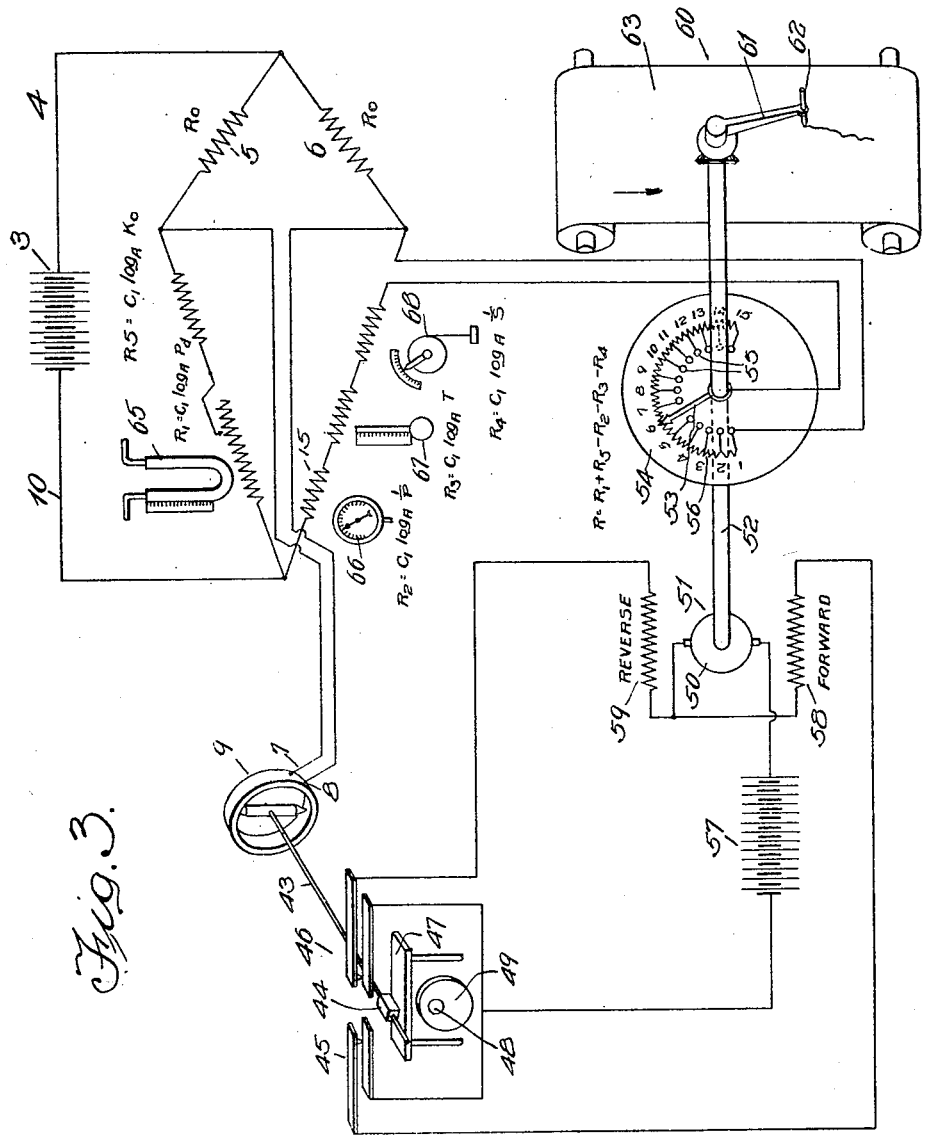

Patented Feb. 23, 1926.

1,573,850

UNITED STATES PATENT OFFICE.

JULIUS M. NAIMAN, OF CHICAGO, ILLINOIS.

LOGARITHMIC RESISTANCE CIRCUIT FOR MEASURING COMBINATIONS OF DIFFERENT FACTORS.

Application filed December 24, 1921. Serial No. 524,809.

*To all whom it may concern:*

Be it known that I, JULIUS M. NAIMAN, a citizen of the United States, residing at Chicago, in the county of Cook and State of Illinois, have invented a new and useful Logarithmic Resistance Circuit for Measuring Combinations of Different Factors, of which the following is a specification.

My invention relates to an electric circuit embodying a plurality of resistances and a galvanometer and is an improvement on the Wheatstone bridge as well as the differential galvanometer method of measuring resistances.

The objects of my improvements are, first, to measure combinations of conditions such as pressure difference, fluid movement, temperature, specific gravity, velocity, calorific value, etc.; second, to secure more accurate measurements than has heretofore been possible; third, to make an electrical measuring device which is susceptible to great flexibility; fourth, to so construct and arrange the elements of the device that any desired combination of conditions can be indicated on the meter dial; fifth, to so construct the device that a change from responding to one condition, as pressure difference in terms of pounds, to another condition, as quantity in cubic feet, is very simple and inexpensive, making the instrument direct reading, and other features to become apparent from the description to follow.

Heretofore the Wheatstone bridge and the differential galvanometer methods have been employed to measure conditions electrically by measuring certain resistances which vary with the changes in the conditions, be that pressure difference, temperature or static pressure, and the same are limited to only three factors. By the use of my invention any number of factors can be combined.

Figure 2:
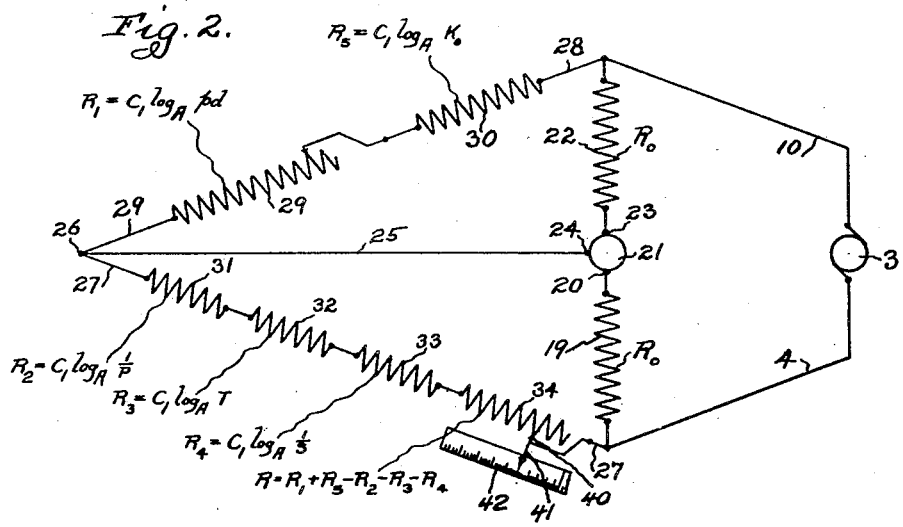

In order to acquaint those skilled in the art to which my invention appertains with the manner of constructing and using my invention, I shall now describe a specific embodiment of the invention in connection with the accompanying drawings which form a part of this specification. In the drawings:

Figure 1 is a diagrammatical view of a Wheatstone bridge circuit embodying my invention, Figure 2 is a similar view showing a differential galvanometer method of measuring circuit embodying my invention, Figure 3 is a diagram of the circuit connections of a system embodying my invention.

Similar reference characters refer to similar parts throughout both views.

On Figure 1 is shown a circuit similar to the Wheatstone bridge circuit, the source of electric current, e. g., a generator, is indicated at 3, the one side of which is connected to conductor 4, which is connected to one side of each resistance 5 and 6, the other sides of the resistances 5 and 6 being connected to opposite terminals 7 and 8 respectively of the galvanometer 9. The other side of the generator 3 is connected to the conductor 10, which is connected to the opposite terminals 7 and 8 of the galvanometer 9 by conductors 11 and 12. Interposed between conductor 10 and conductor 11 are the resistances 13 and 14 connected in series, and interposed between conductor 10 and conductor 12 are the resistances 15, 16, 17 and 18 connected in series.

In Figure 2 is shown a differential galvanometer circuit in which the source of electric current, e. g., a generator, is indicated at 3, the one side of which is connected to conductor 4, which is connected to one side of the resistance 19, the other side of which is connected to the terminal 20 of the differential galvanometer 21. The other side of the generator 3 is connected to the conductor 10 which is connected to one side of resistance 22, the other side of which is connected to another terminal 23 of the differential galvanometer 21. The third terminal 24 of the galvanometer 21 is connected by conductor 25 to the junction point 26 which is connected to one end of each conductor 27 and 28. The other end of conductor 27 is connected to conductor 4, and the remaining end of conductor 28 is connected to conductor 10. Interposed between the two ends of conductor 28 are the resistances 29 and 30 connected in series and interposed between the two ends of conductor 27 are the resistances 31, 32, 33 and 34 connected in series.

I have shown the same resistances in both figures of the drawing so that the problems to follow are applicable to both circuits shown.

Similarly to the ordinary Wheatstone bridge circuit and the ordinary differential galvanometer circuit, the measurement is made when the current flowing through the galvanometer 9 is zero, and obviously to ascertain the measurement a comparison is made of the balancing resistance with the varible resistances. It will be noted that this circuit comprises four resistance arms, one of which contains the balancing resistance together with other variable resistances connected in series. The method of measuring the products, ratios, or both, of several variables, utilizes the fact that the sum of the logarithms of any number of variables is equal to the logarithm of the product of all those variables. Since any number of resistances can be connected in series, the sum of as many logarithms may be obtained, as may be desired.

Figures 1 and 2 show arrangements of my invention for the problem of measuring gas of variable specific gravity and the various resistances are given their identification marks. As above stated, Figure 1, shows a Wheatstone bridge circuit and Figure 2 shows a differential galvanometer circuit.

In the equations to be given—
A = base of logarithms chosen.
$a$ = area of pipe in square feet.
B = gas constant.
C = constant of proportionality.
D = density of the fluid in pounds per cubic foot.
$g$ = 32.2 feet per second$^2$.
H = dynamic head of the fluid in feet.
K = flow coefficient, depending upon the nature of the chosen source of pressure difference.
$K_0$ = calibrating constant.
$K_2$ = new resultant constant for the discharge equation.
P = absolute pressure of gas in pounds per square foot.
Q = any desired meter capacity, cubic feet per hour.
$Q_s$ = rate of discharge in standard cubic feet per second.
R—$R_0$—$R_1$—$R_2$—$R_3$—$R_4$—$R_5$ = resistances.
S = specific gravity of gas with reference to air.

T = absolute temperature of gas °F.
V = Specific volume in cubic feet per pound.
$v$ = velocity in feet per second.
$V_0$ = specific volume; under standard conditions.
W = gravimetric discharge in pounds per second.
53.34 = air constant.

Thus, if a rheostat is provided calibrated in terms of specific gravity to follow the law, $$R_4 = C_1 \log_A \frac{1}{S} \quad (1)$$

and if every time the specific gravity of the gas is tested, the person running the test were to set the rheostat handle at the point of the rheostat corresponding to the gravity found the meter would be corrected for gravity. And if in addition corrections were made for pressure and temperature, the meter would read in standard cubic feet, directly.

The relation between the resistances and the corresponding variables for the circuit shown in Figures 1 and 2 is as follows:

$$R_1 = C_1 \log_A P_d \quad (2)$$
$$R_2 = C_1 \log_A \frac{1}{P} \quad (3)$$
$$R_3 = C_1 \log_A T \quad (4)$$
$$R_5 = C_1 \log_A K_0 \quad (5)$$

In addition to the one given by equation 1; $R_6$ is a constant resistance used for calibration.

The relation between the factors and the rate of discharge in pounds per second, (W), is derived from the basic relations, viz, $$v = K\sqrt{2gH} = K\sqrt{\frac{2gpd}{D}} \quad (6)$$

$$W = avD = aK\sqrt{2gp_d D} \quad (7)$$

$$PV = BT = \frac{53.34 T}{S} \quad (8)$$

$$V = \frac{1}{D} \quad (9)$$

If equations 7, 8 and 9 are combined, we get:

$$W = aK\sqrt{2gp_d D} = aK\sqrt{\frac{2gp_d}{V}} = aK\sqrt{\frac{2gp_d D}{BT}} = aK\sqrt{\frac{2gp_d D}{53.34 T}} = K_2\sqrt{\frac{p_d D}{T}} \quad (10)$$

where, $$K_2 = aK\sqrt{\frac{2g}{53.34}} \quad (11)$$

is the new constant of proportionality.

If the ratio arms of the bridge are both equal to $R_0$, the two variable arms must also be equal, when the galvanometer reads zero. We therefore have:

$$R_1 + R_5 = R_2 + R_3 + R_4 + R, \quad (12)$$

or $$R = R_1 + R_5 - R_2 - R_3 - R_4 = C_1 \log_A p_d + C_1 \log_A K_0 -$$
$$C_1 \log_A \frac{1}{P} - C_1 \log_A T - C_1 \log_A \frac{1}{S} = C_1 \log_A \frac{K_0 p_d PS}{T} \quad (13)$$

And, if the last equation is combined with that of rate of discharge in pounds per second, (W), (see 10,) we have:

$$W = K_2 \sqrt{\frac{p_d PS}{T}} = K_2 \left(A^{\frac{R}{C_1}}\right)^{\frac{1}{2}} \Big/ K_0^{\frac{1}{2}} = K_2 A \frac{R}{2C_1} \quad (14)$$

which shows that the balancing resistance, $R_0$, has a definite relation to the rate of discharge in pounds per second, W, regardless what the change in pressure, temperature or gravity may be. If this rate of discharge, W, is multiplied by the specific volume, $V_0$, i. e., by the volume occupied by one pound of the gas, under standard conditions, the result will give $Q_s$, or the rate of discharge in standard cubic feet per second.

Thus we have:

$$Q_s = WV_0 = \frac{K_2 V_0}{\sqrt{K_0}} A \frac{R}{2C_1} \quad (15)$$

which is the logarithmic flow meter equation. In this equation, we find the term, $K_0$, whose value is set at any chosen point by using the proper calibration resistance, $R_s$. For the maximum value of the balancing resistance, R, in the indicating, registering or recording mechanism, the corresponding maximum rate of discharge, $Q_s$, will depend upon the value of $K_0$, or upon that of the calibrating resistance, $R_5$. By inserting proper balancing or calibration resistances, $R_5$, in to the indicating, registering or recording mechanism, the latter may be used for any desired meter capacity, $Q_s$. The only change necessary in each case is a new indicating meter scale, and a new standard gear ratio in the integrating dials. Also, if any other changes are made, such as a different range of pressure or temperature variation, a properly chosen calibration resistance, $R_5$, corrects for all of these changes without any other change in the recording mechanism. Finally, by proper choice of the calibration resistance, $R_5$, the integrator can be made to read directly in thousand pounds of steam, in thousand standard cubic feet of gas, or in any other convenient units, directly.

The flexibility and convenience of the logarithmic resistance circuit for measurements of combinations of different factors is thus apparent.

The deductions made were all based upon the ratio arms $R_0$, $R_0$, being equal and constant. If one or both of these arms were made to vary with some physical phenomenon, say humidity, H, or any other factor, then we could, instead of making the value of one of the ratio arms, $R_0$, make it:

$$R_6 = R_0 H \quad (16)$$

in addition to the other variable resistances given by equations 1, 2, 3 and 4. Then, when the galvanometer would read zero, we should have:

$$\frac{R_1 + R_5}{R_2 + R_3 + R_4 + R} = \frac{R_0}{R_6}$$

or $$\frac{C_1 \log_A p_d + C_1 \log_A K_0}{C_1 \log_A \frac{1}{P} + C_1 \log_A T + C_1 \log_A \frac{1}{S} + R} = \frac{R_0}{R_0 H}$$

or $$\frac{C_1 \log_A K_0 p_d}{C_1 \log_A \frac{TS}{P} + R} = \frac{R_0}{R_0 H} \quad (17)$$

$$C_1 R_0 H \log_A K_0 p_d = R_0 C_1 \log_A \frac{TS}{P} + R_0 R,$$

or $$R = \frac{R_0 C_1 H \log_A K_0 p_d - R_0 C_1 \log_A \frac{TS}{P}}{R_0} =$$

$$C_1 \log_A \frac{TS(K_0 p_d)H}{P} \quad (18)$$

In other words, by means of variable ratio arms, we can in addition to any number of products and ratios, take care of any number of variable powers automatically.

In operation the resistances $R_1$, $R_2$, $R_3$, $R_4$, and $R_5$, are made responsive to the variables by which they are controlled. In the case of resistance $R_5$ after the calibrating constant $K_0$ is once established, the value of this resistance is fixed to represent a function of the log of said constant. The resistance $R_1$ is varied in accordance with the log of the pressure difference, which is indicated by the manometer 65 subjected to pressure difference due to flow. The resistance $R_2$ is varied in accordance with the log of the reciprocal of absolute pressure which is indicated by the pressure gage 66 actuated by the absolute fluid pressure. The resistance $R_3$ is varied in accordance with the log of absolute temperature of the fluid under consideration as indicated by thermometer 67, and the resistance $R_4$ is varied in accordance with the log of the reciprocal of the specific gravity of the gas as indicated by density actuated meter 68. These various quantities are chosen in proper terms and all referred to the same logarithmic base in order that the combined function may be in the desired terms when evaluated.

As shown in Figure 1 the resistance R is an evaluation of the resistances $R_1$ to $R_5$ inclusive where the resistances $R_1$ to $R_5$ constitute the variables of controlling factors. The resistance R is brought to a value which balances the bridge. At the same time the movable contact 40 of this resistance is brought to the proper value, it moves a mechanical indicator or pointer over the scale 42 which scale is graduated directly in terms of the predetermined result. When the resistance R is evenly distributed between contacts the scale graduations on the scale 42 are not uniform in the sense of being equal for successive unitary values, but follow the logarithmic law like the graduations upon a slide rule. If it is desired to have the scale granduations all to be uniform, then the resistance is disposed logarithmically between even spaced contacts. Thus in either event by automatically balancing the bridge, the pointer 41 is brought to the proper indication on the scale 42 so that the instrument gives direct readings.

The differential galvanometer system shown in Figure 2 is similarly provided with a scale 42 and an indicator 41 which moves with the movable rheostat contact 40. Obviously where the resistance is graduated logarithmically the scale may be uniform.

It is to be understood, furthermore, that the balancing of the resistance R in each case may be done automatically as by means of the galvanometer relay system shown in patent to Obermaier No. 1,376,633 of May 3, 1921.

In Figure 3, I have illustrated the system of Figure 1 with the automatic balancing mechanism employing the Obermaier relay indicating and recording the value of the resistance directly.

In this case the galvanometer 9 has a long slender pointer 43 carrying a block member 44 thereupon this block being adapted to swing to the left or to the right under either the contact pair 45 or the contact pair 46 away from the central or zero position. A cam actuated platen 47 is periodically raised to engage block 44 by means of a constantly rotating shaft 48 having a suitable cam 49 which cam presses the block 44 upward. If the block is at zero position, the same does not affect either of the contact pairs 45 or 46, but if the galvanometer is unbalance the block 44 will be pressed against the contact making device immediately there above to either the left or the right closing the contact pairs 45 or 46 as the case may be. Suitable locking mechanism or its equivalent all as disclosed and claimed in the above patent to Obermaier is provided for holding the contact pairs 45 and 46 closed until such time as the pointer swings back to zero, but for the sake of clearness the same is not herein illustrated.

Any other suitable scheme of securing a periodical testing of the presence of the block 44 and a continuous closing of the contact pairs 45—46 or equivalent mechanism may be employed to the end of securing a continuous or intermittent action in restoring the bridge to balance. Closing of either of the contact pairs actuates the armature 50 of motor 51 which motor has its shaft 52 connected either directly or indirectly to the indicating and contacting arm 53 which indicating and contacting arm sweeps over the indicating dial 54 and over the contacts 55 connected to the resistance R, which is also indicated by the reference numeral 56. The resistance 56 is graduated in terms of the logarithms of the scale graduations or readings upon the indicating dial 54. This makes the dial 54 and the recorder 60 direct reading.

The contact pair 45 is connected in series with a suitable source of current 57 and the forward series field 58 for driving the armature of the motor in a forward direction. The contact pair 46 is included in series with the source 57 and the reverse series field 59 with the armature 50 of the motor so as to drive the motor and connected parts in the reverse direction. The shaft 52 is continued through the indicating and balancing device to a suitable recording device 60 which comprises a suitable arm 61 bearing a stylus 62 movable over a constantly advancing record sheet 63. The record sheet 63 may be driven forward with a uniform motion by any suitable mechanism.

In the present construction I arrange the resistances R, $R_2$, $R_3$ and $R_4$ to be automatically varied by the devices 65, 66, 67 and 68 respectively according to the logarithms of the instantaneous values of the variables to which such devices 65, 66, 67 and 68 are responsive.

The operation of the automatic balancing and indicating and recording device is believed to be obvious from the above detailed description. If the resistance in one of the variable arms changes, the galvanometer 9 responds to the change because of the consequent unbalance of the bridge and swings the pointer with its block 44 to one side or the other of the zero or neutral position whereupon the next movement of the cam 49 causes the block to close the contact pair 45 or the contact pair 46 as the case may be, this pair being then held closed and the other pair remaining open until the the motor 51 brings the contacting arm to a suitable position for balancing the bridge whereupon the corresponding contact pair 45 is released and the indicating and contacting pointer 53 remains at such position until a further condition of unbalance is brought about and again the position of the contacting arm changed to bring the resistance R to the suitable value for balancing the bridge.

The recording arm 61 is swung back and forth over the record sheet 63 making a suitable mark by means of the stylus 62 upon said record sheet so that a permanent graph or record is made.

In the diagram illustrated the contacts 55 are evenly spaced so that a uniform dial 54 may be employed and the resistance is connected according to the logarithmic values.

I do not intend to be limited to the details shown and described.

Having thus fully described my invention, what I claim as new and desire to secure by Letters Patent of the United States is:

1. A method of measuring the product of several variable factors consisting of, making different electrical resistances respectively proportional to the logarithms of different variable factors multiplied by any constants and then measuring the sum of these resistances connected in series.

2. A method of measuring the ratios of several variable factors consisting of, making different electrical resistances respectively proportional to the logarithms of different variable factors multiplied by any constants and then connecting the resistance, corresponding to the factor used as a numerator, into one arm, and the resistances corresponding to the factors used in the denominator in another arm in series with a balancing resistance which measures the difference between the total resistances of the two arms.

3. The method of determining the product of a plurality of variables which comprises, varying an electrical resistance in proportion to the logarithm of the value of one of said variables, varying another electrical resistance in proportion to the logarithm of the value of another of said variables, determining the sum of the logarithmic values of said resistances, and evaluating and indicating said sums in terms of the products of said variables.

4. In combination, a plurality of variable electrical resistances connected in series, means for varying the variable resistances in accordance with the logarithm of the quantities to which said resistances correspond, and means for summing up the resistances included in circuit and evaluating said sum in terms of the product of said variable.

5. In a differential galvanometer circuit for measuring the ratios of several variable factors, the combination of different electrical resistances proportional to the logarithms of different variable factors multiplied by any constants and used as the numerator in one arm of the galvanometer circuit, electrical resistances proportional to the logarithms of different variable factors multiplied by any constants and used as the denominator in another arm of the galvanometer circuit, and a balancing electrical resistance in series with said two arms for measuring the difference between the total resistances of the two arms when the field coils of the galvanometer circuit are made equal.

6. In a differential galvanometer circuit for measuring a variable factor raised to a variable power which is a function of another variable factor, the combination of an electrical resistance in one arm of the galvanometer circuit proportional to a logarithm of the first factor multiplied by any constant, a field coil for the galvanometer having a resistance proportional to the variable power, a second field coil for the galvanometer having a constant resistance, and a balancing resistance which may be varied until the galvanometer reads zero.

In testimony whereof I have signed my name to this specification, this 19th day of December, 1921, at Chicago, Illinois.

JULIUS M. NAIMAN.